United States Patent [19]
Sexton

[11] Patent Number: 5,584,263
[45] Date of Patent: Dec. 17, 1996

[54] PET FOOD DISH ELEVATING ASSEMBLY

[76] Inventor: James E. Sexton, 2208 Rio Oso Rd., Rio Oso, Calif. 95674

[21] Appl. No.: 531,418

[22] Filed: Sep. 21, 1995

[51] Int. Cl.$^6$ .............................. A01K 5/01; A01K 5/02
[52] U.S. Cl. ..................... 119/51.5; 119/57.92; 119/61
[58] Field of Search ............................... 119/51.5, 51.11, 119/51.12, 57.92, 61

[56] References Cited

U.S. PATENT DOCUMENTS

| | | | |
|---|---|---|---|
| 2,528,742 | 11/1950 | Coffing | 119/51.5 |
| 4,077,360 | 3/1978 | Figlia | 119/51.12 |
| 5,129,361 | 7/1992 | Deutsch et al. | 119/51.12 |
| 5,509,376 | 4/1996 | Tsengas | 119/51.5 |

*Primary Examiner*—Cary E. O'Connor
*Assistant Examiner*—Yvonne R. Abbott

[57] ABSTRACT

A pet food dish elevating assembly comprising: a main housing unit formed as a generally rectangular shaped box with an essentially hollow interior, a front face and opposing sidewalls, the interior including an electrically powered motor and two large buttons operatively coupled to the motor, the buttons extending through the front face, an axle being rotatably coupled within the side walls and including at least two axle sprockets, a motor sprocket extending from the motor and coupled to a first axle sprocket by a horizontal chain, activation of the motor causing the motor sprocket to rotate thereby rotating the axle of the apparatus; and at least one vertical leg coupled to the main housing unit, a vertical chain being positioned within a leg and around a second axle sprocket, a tray formed in a generally L-shaped configuration being coupled to the vertical chain, a user depressing a first button to move the tray upwardly, a user depressing a second button to move the tray downwardly.

5 Claims, 3 Drawing Sheets

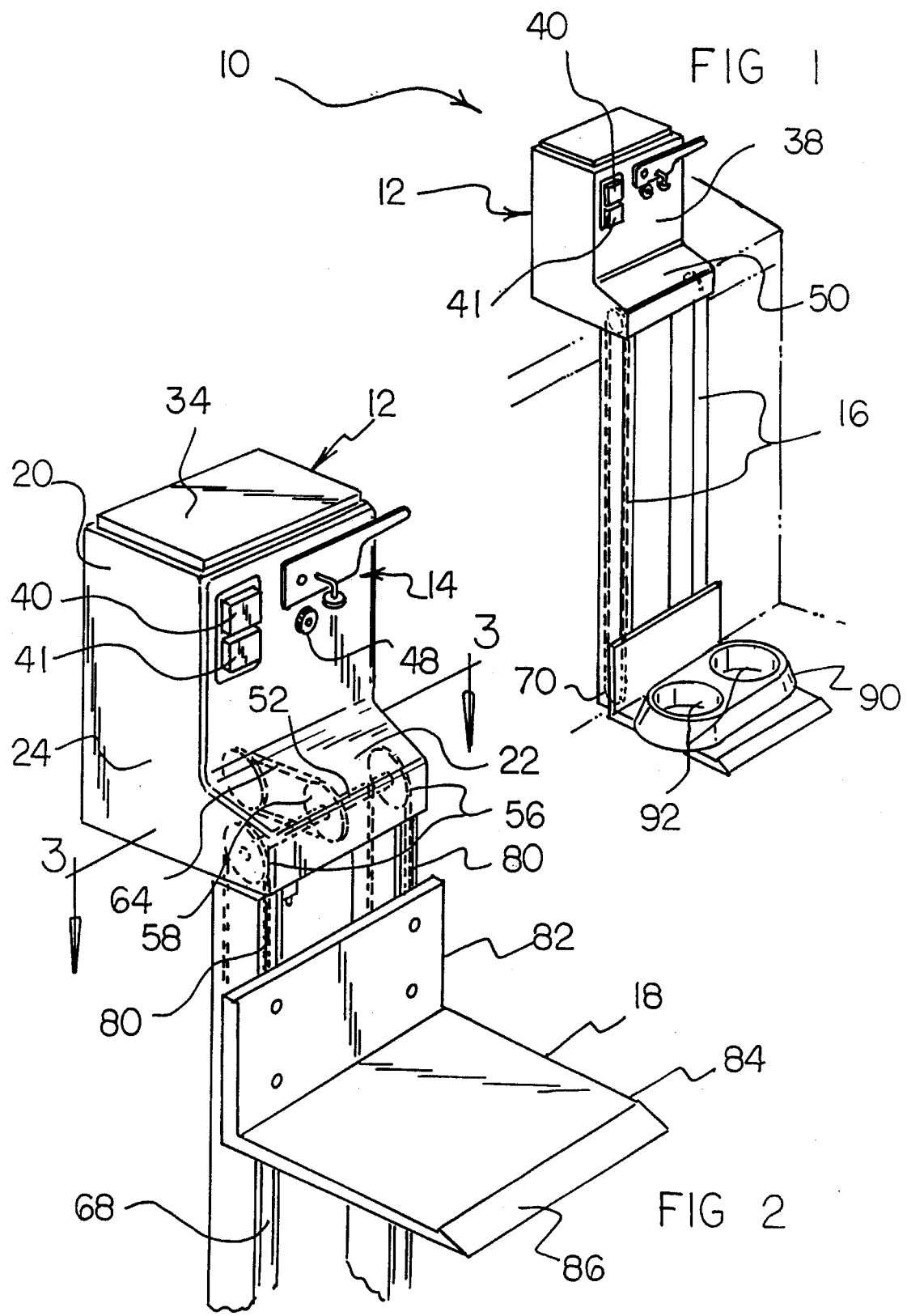

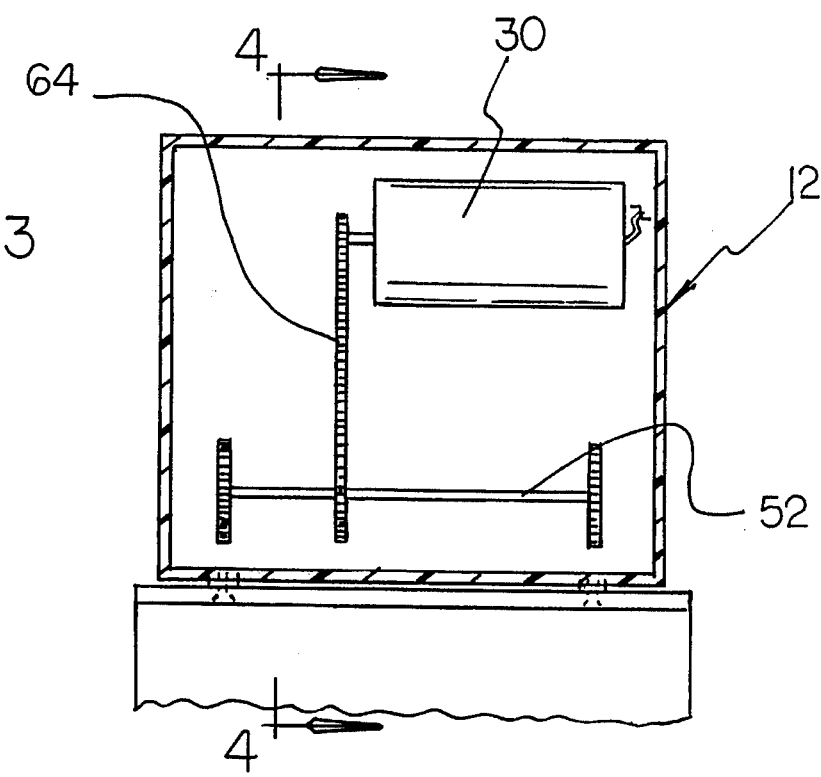
FIG 3
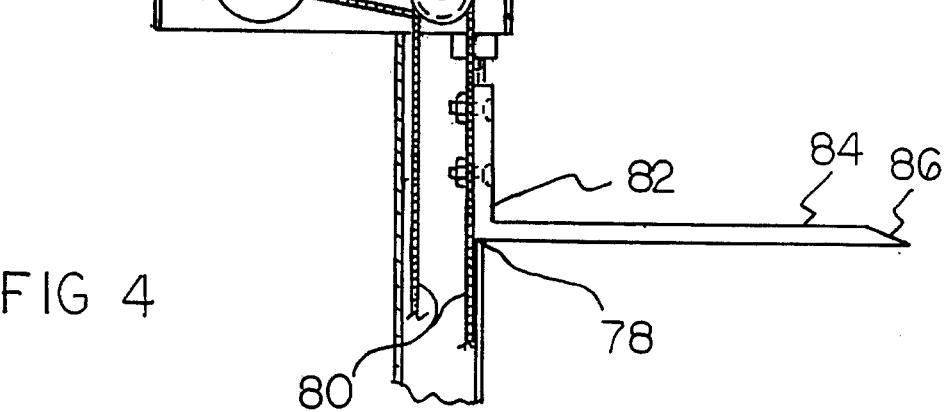
FIG 4
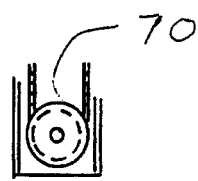

PET FOOD DISH ELEVATING ASSEMBLY

BACKGROUND OF THE INVENTION

1. Field of the Invention

The present invention relates to a pet food dish elevating assembly and more particularly pertains to elevating the tray of the assembly to a vertical height permitting easy cleaning and refilling of pet food bowls positioned thereon.

2. Description of the Prior Art

The use of elevating devices is known in the prior art. More specifically, elevating devices heretofore devised and utilized for the purpose of lifting a variety of objects to a plurality of different heights are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 3,430,734 to Embree a portable elevating apparatus.

U.S. Pat. No. 3,957,137 to Vermette discloses a portable material lift.

U.S. Pat. No. 4,427,094 to Winkelblech discloses a portable elevator device.

U.S. Pat. No. 4,399,570 to Tracy discloses a portable lift for handicapped persons.

Lastly, U.S. Pat. No. 4,919,234 to Pearson discloses a portable lift.

In this respect, the pet food dish elevating assembly according to the present invention substantially departs from the conventional concepts and designs of the prior art, and in doing so provides an apparatus primarily developed for the purpose of elevating the tray of the assembly to a vertical height permitting easy cleaning and refilling of pet food bowls positioned thereon.

Therefore, it can be appreciated that there exists a continuing need for a new and improved pet food dish elevating assembly which can be used for elevating the tray of the assembly to a vertical height permitting easy cleaning and refilling of pet food bowls positioned thereon. In this regard, the present invention substantially fulfills this need.

SUMMARY OF THE INVENTION

In view of the foregoing disadvantages inherent in the known types of elevating devices now present in the prior art, the present invention provides an improved pet food dish elevating assembly. As such, the general purpose of the present invention, which will be described subsequently in greater detail, is to provide a new and improved pet food dish elevating assembly and method which has all the advantages of the prior art and none of the disadvantages.

To attain this, the present invention essentially comprises a new and improved pet food dish elevating assembly comprising, in combination: a main housing unit formed as a generally rectangular shaped box with an essentially hollow interior, the main housing unit having an upper region, a lower region and opposing sidewalls, the essentially hollow interior including electrically powered first and second motors, the main housing unit having a top with a generally rectangular shaped recess positioned therein, a generally rectangular shaped cutting board being removably positionable within the recess, the upper region of the main housing unit having a front face including two large buttons operatively coupled to the second motor; a can opener assembly being positioned upon the front face of the main housing unit, the can opener assembly comprising a handle pivotally coupled in a horizontal orientation to the front face, the can opener assembly also including a magnet extending from the handle and a grooved wheel rotatably coupled beneath the magnet, the electrically powered first motor being operatively coupled to the wheel of the apparatus, the can opener assembly permitting users to open food cans by coupling a can to the magnet and activating the assembly by pushing downward on the handle; the lower region of the main housing unit including a frontwardly projecting portion with a horizontally positioned axle having two free ends, the axle including three vertically positioned planar circular sprockets, first and second end sprockets being positioned near opposing ends of the axle, a third central sprocket being positioned between the first and second end sprockets, the ends of the axle being rotatably coupled within the side walls of the lower region, a second motor including a fourth sprocket extending therefrom, the third and fourth sprockets being coupled together by a horizontally positioned chain, activation of the second motor causing the fourth sprocket to rotate thereby rotating the axle of the apparatus; two vertical legs being formed in a hollow generally rectangular configuration, each leg being coupled to the main housing unit beneath the end sprockets, each leg having a front edge including a vertical slot positioned therein, two vertically positioned chains, each chain being positioned around the end sprocket and around a corresponding lower sprocket; a tray being formed in a generally L-shaped configuration with a short vertical member and a long horizontal member, the horizontal member having a downwardly angled front edge, the vertical member being coupled to the two vertically positioned sprockets of the apparatus, a pet food bowl including two recesses to permit separation of food and water placed therein, the pet food bowl adapted to be positioned upon the horizontal portion of the tray, the user depressing a first button to elevate the tray and pet food bowl to a vertical height permitting easy cleaning and refilling thereof, the user depressing a second button to descend the bowl to the floor.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pet food dish elevating assembly which has all of the advantages of the prior art elevating devices and none of the disadvantages.

It is another object of the present invention to provide a new and improved pet food dish elevating assembly which may be easily and efficiently manufactured and marketed.

It is further object of the present invention to provide a new and improved pet food dish elevating assembly which is of durable and reliable constructions.

An even further object of the present invention is to provide a new and improved pet food dish elevating assembly which is susceptible of a low cost of manufacture with regard to both materials and labor, and which accordingly is then susceptible of low prices of sale to the consuming public, thereby making such pet food dish elevating assembly economically available to the buying public.

Still yet another object of the present invention is to provide a new and improved pet food dish elevating assembly which provides in the apparatuses and methods of the prior art some of the advantages thereof, while simultaneously overcoming some of the disadvantages normally associated therewith.

Still another object of the present invention is to elevate the tray of the assembly to a vertical height permitting easy cleaning and refilling of pet food bowls positioned thereon.

Lastly, it is an object of the present invention to provide a new and improved pet food dish elevating assembly comprising: a main housing unit formed as a generally rectangular shaped box with an essentially hollow interior, a front face and opposing sidewalls, the interior including an electrically powered motor and two large buttons operatively coupled to the motor, the buttons extending through the front face, an axle being rotatably coupled within the side walls and including at least two axle sprockets, a motor sprocket extending from the motor and coupled to a first axle sprocket by a horizontal chain, activation of the motor causing the motor sprocket to rotate thereby rotating the axle of the apparatus; and at least one vertical leg coupled to the main housing unit, a vertical chain being positioned within a leg and around a second axle sprocket, a tray formed in a generally L-shaped configuration being coupled to the vertical chain, a user depressing a first button to move the tray upwardly, a user depressing a second button to move the tray downwardly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the pet food dish elevating assembly constructed in accordance with the principles of the present invention.

FIG. 2 is a partially broken away perspective view of the apparatus illustrating the tray oriented in the up position.

FIG. 3 is a bottom perspective view of the apparatus taken along section line 3—3 of FIG. 2.

FIG. 4 is side cross sectional view of the apparatus taken along section line 4—4 of FIG. 3.

The same reference numerals refer to the same parts through the various Figures.

DESCRIPTION OF THE PREFERRED EMBODIMENT

Figure 5:
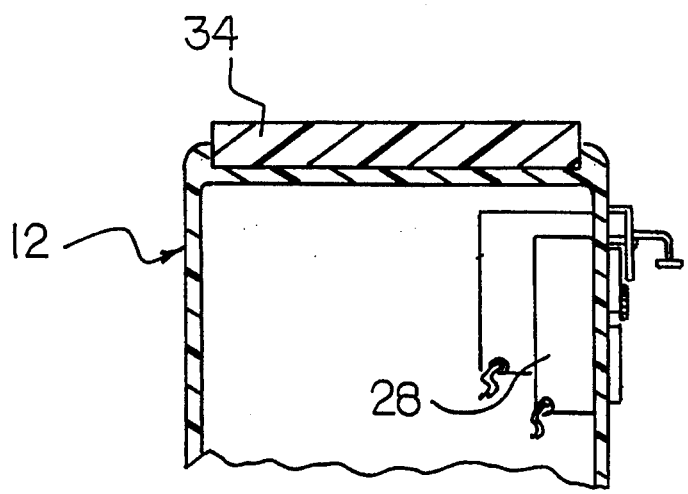
FIG. 5 is a side cross sectional view of the apparatus illustrating the positioning of the cutting board.

With reference now to the drawings, and in particular to FIG. 1 thereof, the preferred embodiment of the new and improved pet food dish elevating assembly embodying the principles and concepts of the present invention and generally designated by the reference numeral 10 will be described.

The present invention, the pet food dish elevating assembly 10 is comprised of a plurality of components. Such components in their broadest context include a main housing unit 12, a can opener assembly 14, a two vertical legs 16 and a tray 18. Such components are individually configured and correlated with respect to each other so as to attain the desired objective.

More specifically, the main housing unit 12 is formed as a generally rectangular shaped box with an essentially hollow interior. In the preferred embodiment, the main housing unit is fabricated of either plastic, metal or a combination of the two. The housing unit is approximately eighteen inches wide and eight inches deep. The main housing unit has an upper region 20, a lower region 22 and opposing sidewalls 24. The ideal location for the housing unit is near a front edge of a kitchen counter top. At such a location, the legs are positioned flush to the front edge of the counter. On the bottom of the apparatus are a plurality of feet to frictionally engage the counter top, thereby preventing slippage. Note FIGS. 1 and 3.

Figure 6:
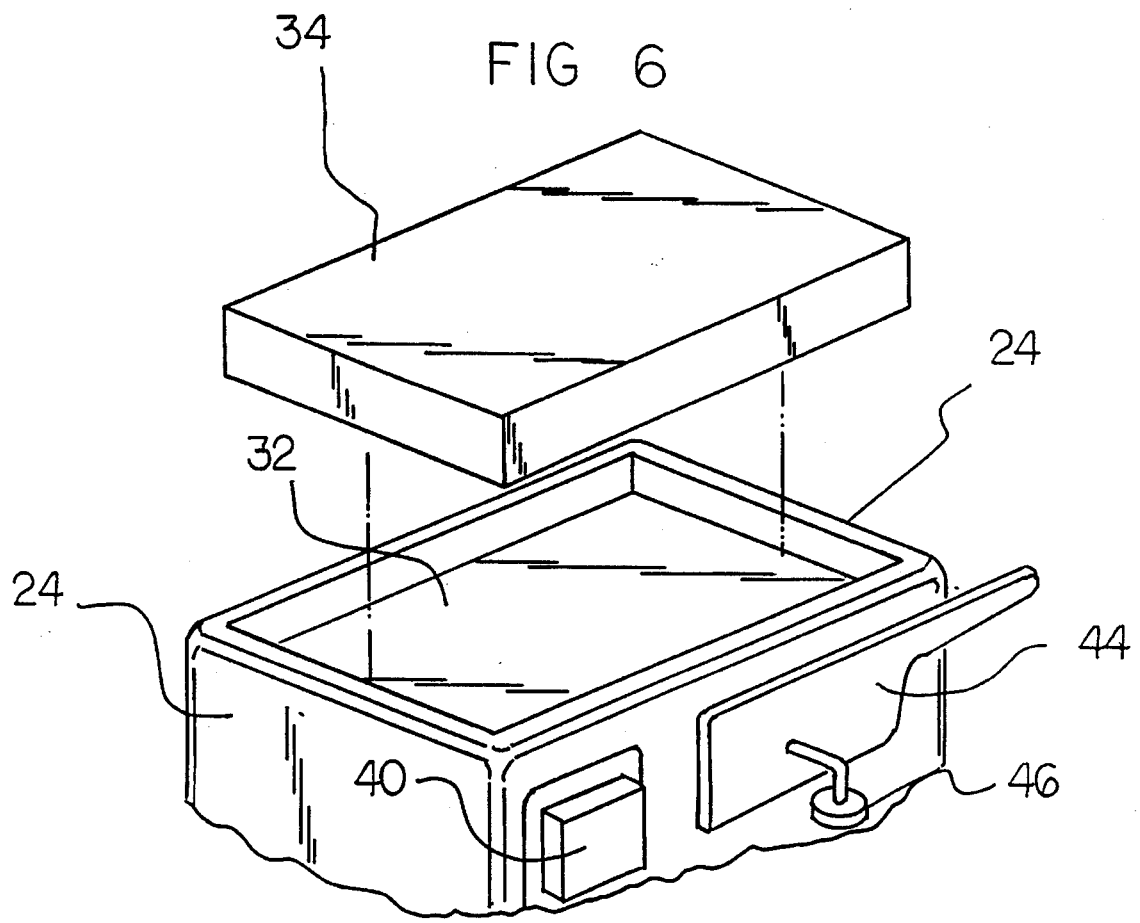
FIG. 6 is a broken away perspective view of the apparatus illustrating the cutting board separated from the top of the main housing unit.

The essentially hollow interior includes an electrically powered motor 30, which drives the apparatus. In the preferred embodiment, the motor is operatively coupled to an A-C electrical power source, such as standard residential socket. The main housing unit also has a top with a generally rectangular shaped recess 32 therein. A generally rectangular shaped cutting board 34 is removably positionable within the recess. The cutting board has a greater thickness than the depth of the recess. When placed in the recess, the upper portion of the cutting board extends to a height greater than the upper edge of the top of the apparatus. The removable nature of the cutting board allows for the convenient cleaning of the board. The cutting board can be used to chop up other foods, such as table scraps to be served to the pet. Note FIGS. 5 and 6.

The upper region of the main housing unit has a front face 38 including two large buttons 40, 41 operatively coupled to the second motor. The buttons are positioned in a vertical orientation, one above the other. The first button, on the top, allows the user to raise the tray up to the level of a counter top. At such a level, elderly or disabled users can easily access the bowl for cleaning and refilling. The second button, on the bottom, allows the user to lower the tray and bowl to the floor allowing easy by a pet. Note FIGS. 1 and 2.

A can opener assembly 14 is positioned upon the front face of the main housing unit. The can opener assembly comprises a handle 44 pivotally coupled in a horizontal orientation to the front face. The can opener assembly also includes a magnet 46 extending from the handle and a grooved wheel 48 rotatably coupled beneath the magnet. The electrically powered first motor is operatively coupled to the wheel of the apparatus. To open a food can, the user couples the top of a can to the magnet. The user then depresses the handle, thereby activating the assembly. When activated, the first motor turns the wheel, thereby turning the can. The top of the can is cut open by a sharp edge on the lower portion of the handle. Note FIGS. 1 and 6.

The lower region of the main housing unit includes a frontwardly projecting portion 50. A horizontally oriented axle 52 with two free ends is positioned within the frontwardly projecting portion 50. When the housing unit is positioned upon a counter top, the frontwardly projecting portion extend over the edge of the counter top. The axle includes three vertically positioned planar circular sprockets. The first and second end sprockets 56 are positioned near opposing ends of the axle. A third central sprocket 58 is positioned between the first and second end sprockets, at the approximate center point of the axle. The ends of the axle are rotatably coupled within the side walls of the lower region. Note FIG. 2.

A second motor includes a fourth sprocket 60 extending from it. The third 58 and fourth 60 sprockets are coupled together by a horizontally positioned chain 64. Activation of the second motor causes the fourth sprocket to rotate thereby rotating the third sprocket and axle of the apparatus. This action causes the first and second sprockets to rotate thereby rotating the operatively coupled vertically positioned chains. Note FIGS. 2 and 4.

Two vertical legs 16 are formed in a hollow generally rectangular configuration. In the preferred embodiment the legs are fabricated of metal. However, in alternative embodiments, the legs may be fabricated of plastic or other sturdy material. Each leg is coupled to the main housing unit beneath each respective end sprocket. The height of the apparatus, including the housing unit and the legs, is approximately forty four inches. Each leg has a front edge which includes a vertical slot 68. The leg slots provide the required maneuverability for elevating and descending the tray of the apparatus. The two vertically positioned chains 80 are each positioned around its corresponding end sprocket. Each chain is also coupled around a corresponding lower sprocket 70. The lower sprockets 70 are positioned at lower ends of the two vertical legs in a similar configuration to the first and second sprockets 56. This configuration forms a continuous loop comprising a chain and mounting bolts. Note FIGS. 2 and 4.

A tray 18 is formed in a generally L-shaped configuration with a short vertical member 82 and a long horizontal member 84. In the preferred embodiment, the tray is fabricated of plastic or metal. The horizontal member has a downwardly angled front edge 86. The angled front edge facilitates access by a small pet to a food bowl positioned on the tray. The vertical member 82 is coupled to the two vertically positioned chains 80 of the apparatus by a nut and bolt arrangement. A pet food bowl 90 includes two recesses 92 to permit separation of food and water. The pet food bowl is adapted to be positioned upon the horizontal portion of the tray. The user depresses a first button 40 to rotate the chains in a counter-clockwise direction thereby elevating the tray and pet food bowl to a vertical height permitting easy cleaning and refilling thereof. The user depresses a second button 41 to rotate the chains in a clockwise direction thereby lowering the tray and pet food bowl to the floor. Limit switches 28 are also incorporated into the apparatus to detect the position of the chains and dishes and to stop the motor once the tray 18 has reached either the desired height or once the tray 18 is lowered to the floor. Note FIGS. 1–3.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved pet food dish elevating assembly comprising, in combination:

a main housing unit formed as a generally rectangular shaped box with an essentially hollow interior, the main housing unit having an upper region, a lower region and opposing sidewalls, the essentially hollow interior including electrically powered first and second motors, the main housing unit having a top with a generally rectangular shaped recess positioned therein, a generally rectangular shaped cutting board being removably positionable within the recess, the upper region of the main housing unit having a front face including two large buttons operatively coupled to the second motor;

a can opener assembly being positioned upon the front face of the main housing unit, the can opener assembly comprising a handle pivotally coupled in a horizontal orientation to the front face, the can opener assembly also including a magnet extending from the handle and a grooved wheel rotatably coupled beneath the magnet, the electrically powered first motor being operatively coupled to the wheel of the apparatus, the can opener assembly permitting users to open food cans by coupling a can to the magnet and activating the assembly by pushing downward on the handle;

the lower region of the main housing unit including a frontwardly projecting portion with a horizontally positioned axle having two free ends, the axle including three vertically positioned planar circular sprockets, first and second end sprockets being positioned near opposing ends of the axle, a third central sprocket being positioned between the first and second end sprockets, the ends of the axle being rotatably coupled within the side walls of the lower region, the second motor including a fourth sprocket extending therefrom, the third and fourth sprockets being coupled together by a horizontally positioned chain, activation of the second motor causing the fourth sprocket to rotate thereby rotating the axle of the apparatus;

two vertical legs being formed in a hollow generally rectangular configuration, each leg being coupled to the main housing unit beneath the end sprockets, each leg having a front edge including a vertical slot positioned therein, two vertically positioned chains, each chain being positioned around an end sprocket and around a corresponding lower sprocket; and a tray being formed in a generally L-shaped configuration with a short vertical member and a long horizontal member, the horizontal member having a downwardly angled front edge, the vertical member being coupled to the two vertically positioned chains of the apparatus, a pet food bowl including two recesses to permit separation of food and water placed therein, the pet food bowl adapted to be positioned upon the horizontal portion of the tray, the user depressing a first button to elevate the tray and pet food bowl to a vertical height permitting easy cleaning and refilling thereof, the user depressing a second button to descend the bowl to the floor.

2. A pet food dish elevating assembly comprising:

a main housing unit formed as a generally rectangular shaped box with an essentially hollow interior, a front face and opposing sidewalls, the interior including an electrically powered motor and two large buttons operatively coupled to the motor, the buttons extending through the front face, an axle being rotatably coupled within the side walls and including at least two axle sprockets, a motor sprocket extending from the motor and coupled to a first axle sprocket by a horizontal chain, activation of the motor causing the motor sprocket to rotate thereby rotating the axle of the apparatus; and at least one vertical leg coupled to the main housing unit, a vertical chain being positioned within a leg and around a second axle sprocket, a tray formed in a generally L-shaped configuration being coupled to the vertical chain, a user depressing a first button to move the tray upwardly, a user depressing a second button to move the tray downwardly.

3. The pet food dish elevating assembly as set forth in claim 2 wherein the main housing unit includes an electrically powered second motor, and further includes:

a can opener assembly positioned upon the front face of the main housing unit, the can opener assembly comprising a handle pivotally coupled in a horizontal orientation to the front face, the can opener assembly also including a magnet extending from the handle and a grooved wheel rotatably coupled beneath the magnet, the electrically powered second motor being operatively coupled to the wheel of the apparatus, the can opener assembly permitting users to open food cans by coupling a can to the magnet and activating the assembly by pushing downward on the handle.

4. The pet food dish elevating assembly as set forth in claim 2 wherein the main housing unit has a top with a generally rectangular shaped recess positioned therein, a generally rectangular shaped cutting board being removably positionable within the recess.

5. The pet food dish elevating assembly as set forth in claim 2 and further including:

a pet food bowl including two recesses to permit separation of food and water placed therein, the pet food bowl adapted to be positioned upon the tray of the apparatus.

* * * * *